3,792,119
SOLID, NON-CAKING, FREE-FLOWING STYRENE/
MALEIC ANHYDRIDE COMPOSITIONS
Dale R. Dill, St. Louis, Mo., and William O. Springer,
Belleville, Ill., assignors to Monsanto Company, St.
Louis, Mo.
No Drawing. Filed Sept. 22, 1969, Ser. No. 860,019
Int. Cl. C08f 29/34
U.S. Cl. 260—874                           9 Claims

ABSTRACT OF THE DISCLOSURE

Solid, non-caking, free-flowing compositions comprising particulate styrene/maleic anhydride polymers subject to caking during storage having dispersed therein an anti-caking amount of a natural or synthetic polymer anti-caking agent which is soluble in water or aqueous alkali and which does not have any substantial tendency to cake during storage.

---

This invention relates to particulate solid, non-caking, free-flowing styrene/maleic anhydride polymer compositions.

As used herein, the term "S/MA" means styrene/maleic anhydride.

As used herein, the term "S/MA polymer" means S/MA interpolymer and the esters, ammonium salts, substituted ammonium salts, alkali metal salts, half esters, half amides, mixed amide salts and mixed ester salts of S/MA interpolymers as well as mixtures thereof.

The phenomenon of caking is well-known in the art although the mechanism thereof is not completely understood. It is generally agreed that the term "caking" refers to the bonding together of the particles of a particulate solid. Familiar examples of caking are the setting up of fertilizer when exposed to moisture, the similar phenomenon exhibited by brown sugar when exposed to varying atmospheric conditions over a period of time, and the "cold flow" flow of polymeric materials. Caking of many particulate substances occurs under the weight of the substance without more and such caking is usually accelerated when the particulate material is placed under weight other than its own, such as that of a pile of sacks of similar material. The latter situation, common in storage of particulate material, is generally referred to as caking which takes place "under compaction."

A wide variety of S/MA polymers are used extensively in paper sizing applications. In commercial practice, many S/MA polymers are sold in particulate form. Certain of the desirable S/MA copolymers are not sold in particulate form since they are susceptible to caking. The caking of the S/MA polymers susceptible to caking usually occurs within a short time after preparation, and when under compaction a hard cake forms within one day. The caked material can be broken up into lumps by pounding or throwing bag material against hard objects, but it cannot be restored to the original free-flowing condition without mechanical grinding or comminuting.

An object of this invention is to provide non-caking, free-flowing particulate S/MA polymers from those S/MA polymers which have a substantial tendency to cake during storage. A further object is to provide a method of modifying S/MA polymers which have a substantial tendency to cake during storage so that such caking is substantially eliminated.

The above and other objects of this invention are accomplished by carrying out the method which comprises dispersing within S/MA polymers which have any substantial tendency to cake during storage, an anti-caking amount of certain natural or synthetic polymers soluble in water or aqueous alkali which do not cake during storage or at least which have a substantially less tendency to cake during storage than the S/MA polymers in which the polymeric anti-caking agents are dispersed.

The method can be carried out in any convenient or suitable manner known in the art for coating particulate material. The polymeric anti-caking agent can be admixed with S/MA polymer by mechanical means such as spraying onto the surface of the material being contacted followed by drying and comminuting to obtain a free-flowing composition. Alternatively, the method can be carried out by dissolving the polymeric anti-caking agent in a non-solvent for the S/MA polymer to be coated, slurrying the S/MA polymer to be coated in the resulting solution, removing the coated S/MA polymer by filtration and drying to obtain a free-flowing composition. A further method which may be used in accordance with this invention comprises admixing the S/MA polymer to be treated and the natural or synthetic polymeric anti-caking agent by mechanical means while both are in particulate form. The particle size of the polymeric anti-caking agent will preferably be substantially less than the particle size of the S/MA polymer being treated when this method of dispersing the anti-caking agent in the S/MA polymer is employed.

The treated S/MA polymers of this invention may be dried by any drying method and at any temperature, pressure, and time applicable to drying particulate material as long as the conditions employed are such that substantial degradation does not occur.

The incorporation of the natural or synthetic polymeric anti-caking agent in the S/MA polymer results in a composition which remains free-flowing or capable of being readily restored to a free-flowing condition. Under compaction and/or atmospheric conditions of an adverse nature, slight caking may occur after several months. However, the usual amount of mechanical jolting incidental to normal handling of such material will restore the S/MA polymer to a free-flowing condition. In most instances, restoration to free-flowing condition is obtained by merely dropping a bag of the S/MA polymer to a solid surface from a height of a few feet. As previously noted, untreated S/MA polymer which undergoes caking can be restored to a free-flowing condition only by the relatively complicated and uneconomical procedure of grinding or comminuting.

The invention is applicable to all S/MA polymers which have any substantial tendency to cake during storage. S/MA copolymers are well-known in the art and are suitably prepared by copolymerizing substantially equimolar amounts of styrene and maleic anhydride, maleic acid or esters of maleic acid. S/MA terpolymers and higher polymers are also well-known in the art and are prepared by polymerizing styrene, one or more of the above maleic components, and at least one third component which can be any of the other alpha, beta unsaturated polybasic acids, esters or anhydrides thereof, such as fumaric acid, itaconic acid, diethyl fumarate, dibutyl fumarate, diethyl itaconate, and the like; and vinyl monomers such as acrylonitrile, vinyl acetate and the like. The water-soluble derivatives of the S/MA polymers such as the ammonium salts, the amine salts, the alkali metal salts, the half amide or salts thereof, and the half ester salts are prepared by treating the appropriate S/MA polymer with a suitable base, such as the alkalies or ammonia for salt derivatives, and with ammonia or amine for amide derivatives. The amide derivatives are then converted to the mixed amide salts by treatment with a suitable base.

S/MA polymers generally have a molecular weight from about 1,000 to about 500,000 and preferably from about 7,000 to about 150,000 for use in many paper applications. The preferred S/MA polymers can be further characterized by a specific viscosity range of about 0.2 to about 1.25 as determined in a 1% by weight solution of dimethyl formamide.

Illustrative derivatives of S/MA polymers include esters such as methyl butyl ester, methyl dodecyl ester, methyl isopropyl ester, methyl butyl glycol ethyl ether ester, methyl cyclohexyl ester and the like; half esters such as butyl ester, methyl ester, cyclohexyl ester, glycol ethyl ether ester and the like; salts such as the mono- and di-ammonium salts, the mono- and di-amine salts of mono-, di- and tri-methyl amine, ethyl amine, isopropyl amine, ethanol amine, 2-methyl-2-aminopropanol-1, and the like, the alkali metal salts such as the mono- and di-lithium, sodium and potassium salts and mixtures thereof; the half amides such as butyl amide, methyl amide, octyl amide, octadecyl amide, benzyl amide, cyclohexyl amide, diethyl amide, dibutyl amide, methylbenzyl amide, methylcyclopentyl amide, and the like; the mixed amide salts such as the ammonium, sodium, potassium, diethylamine or dibutylamine salts of butyl amides, the ammonium, sodium, potassium, dimethylamine and dibutylamine salts of methyl amide and the like; and the mixed ester salts such as the ammonium, sodium, potassium, dimethylamine or butylamine salts of the butyl ester, the ammonium, sodium potassium, dimethylamine or cyclohexylamine salts of the octyl ester and the like.

In general, S/MA polymers which have a softening point below about 100° C. have a tendency to cake during storage. The term "softening point" as used herein means the temperature at which the S/MA polymer is deformed under a slight amount of pressure. Examples of S/MA polymers which have a softening point below about 100° C. include the lauryl half ester, the methoxy triglycol half ester, and the methyl diethylene glycol ethyl ether half ester. S/MA polymers which have a softening point below about 40° C. are generally not used in particulate form.

The natural and synthetic polymeric anti-caking agents which are dispersed in or coated on the S/MA polymers to prevent caking during storage in accordance with this invention include water-soluble or aqueous alkali-soluble S/MA polymers, starches, and polyvinyl alcohols which do not have any substantial tendency to cake during storage.

In general, the S/MA polymers useful as anti-caking agents in accordance with this invention will have a softening point above about 100° C., and preferably from about 120° C. to about 190° C. Examples of S/MA polymers useful as anti-caking agents in accordance with this invention include the methyl ester, the butyl ester, the disodium salt, the butyl ester amide ammonium salt and S/MA copolymer or terpolymer per se.

Starches which may be used as polymeric anti-caking agents in accordance with this invention include any amylaceous substance such as untreated starch as well as starch which has been treated by chemicals or other means to produce oxidized, dextrinized, hydrolyzed, esterified or etherified derivatives of starch so long as the starch derivative is soluble in water or aqueous alkali. The starches may be derived from any plant source including corn, waxy maize, sorghum, tapioca, potato, wheat, rice and sago.

Useful oxidized derivatives of starch includes those disclosed in U.S. Pat. 3,777,339. Useful hydroxyalkyl starches include hydroxyethyl starch and hydroxypropyl starch as disclosed in U.S. Pat. 3,033,859. Other starch ethers and starch esters useful in this invention include those disclosed in U.S. Pats. 2,698,937 and in 2,853,484.

The polyvinyl alcohol used in accordance with this invention can also contain acetate groups as long as the polyvinyl alcohol is soluble in water or aqueous alkali.

The amount of anti-caking agent used in accordance with this invention will vary with the specific natural or synthetic polymeric anti-caking agent employed as well as the particle size of the specific S/MA polymer being treated. The benefits derived through the use of this invention are applicable to particulate S/MA polymers regardless of particle size. In general, from about 0.5 part by weight to 20 parts by weight of anti-caking agent are employed per 100 parts by weight of S/MA polymer. Preferably from about 2 parts by weight to about 10 parts by weight of polymeric anti-caking agent are employed. It has been noted that a greater amount of anti-caking agent is usually required for very small particle size S/MA polymers than for relatively larger size S/MA polymers. For certain paper sizing applications, it may be desirable to have more than 20 parts by weight of polymeric anti-caking agent present per 100 parts of S/MA polymer.

The following examples are given to illustrate in detail how the method of this invention is carried out. It is to be understood that the specific details given in the examples are not to be considered as limiting the scope of the invention.

EXAMPLE 1

A butyl glycol ethyl ether ester of S/MA copolymer having a softening point of about 50° C. is ground in a mill to the following particle size distribution. Twelve wt. percent is retained on a 10 mesh sieve (U.S. sieve series), 44 wt. percent is retained on a 20 mesh sieve and the remaining 44 wt. percent passes through the 20 mesh sieve. A portion of this copolymer is divided and placed in three glass jars. After about 16 hours, the copolymer cakes severely and cannot be returned to a free-flowing condition without grinding or comminuting. A portion of the copolymer (100 parts) is admixed with 5 parts of a methyl butyl ester of S/MA copolymer having a softening point of about 145° C. and a particle size distribution of 2 wt. percent retained on a 60 mesh sieve (U.S. sieve series) and 25 wt. percent retained on an 80 mesh sieve. Admixing is carried out in the dry state with stirring and the treated copolymer is divided into portions and placed in 5 glass jars. The bottles are checked for caking at varying time intervals after treatment. Results and further details are set forth in Table I below.

TABLE I

| Bottle number | Time after treatment, weeks | Caking |
|---|---|---|
| 1 | 1 | None. |
| 2 | 2 | Do. |
| 3 | 4 | Do. |
| 4 | 8 | Do. |
| 5 | 12 | Do. |

EXAMPLE 2

Substantially the same procedure of Example 1 was repeated using a hydroxyethyl starch (Penford-280-Penick and Ford Ltd.) having a D.S. of 0.2 as the polymeric anti-caking agent in place of the methyl butyl ester. Results and further details are given in Table II below.

TABLE II

| Bottle number | Time after treatment, weeks | Caking |
|---|---|---|
| 1 | 1 | None. |
| 2 | 2 | Do. |
| 3 | 4 | Do. |
| 4 | 8 | Do. |
| 5 | 12 | Do. |

EXAMPLE 3

Polyvinyl alcohol (Gelvatol–20–90) having a weight average molecular weight of about 125,000, a 20 wt. percent residual polyvinyl acetate content and a particle size distribution of all passing through a 10 mesh sieve (U.S. sieve series) and all retained on a 60 mesh sieve is used in place of the methyl butyl ester of Example 1. Following substantially the same procedure as in Example 1 the results as given in Table III are obtained.

TABLE III

| Bottle number | Time after treatment, weeks | Caking |
|---|---|---|
| 1 | 1 | None. |
| 2 | 2 | Do. |
| 3 | 4 | Do. |
| 4 | 8 | Do. |
| 5 | 12 | Do. |

EXAMPLE 4

The procedure of Example 1 is repeated except that the methyl butyl ester is used at a concentration of 10 parts per 100 parts of butyl glycol ethyl ether ester with substantially the same results as in Example 1.

EXAMPLE 5

The procedure of Example 3 is repeated except that 0.5 part of polyvinyl alcohol is employed with substantially the same results as in Example 1.

The solid non-caking, free-flowing S/MA polymer compositions of this invention are useful in paper sizing applications, in many coating applications other than paper and as dispersants for pigments and as thinners for drilling muds.

While this invention has been described with respect to various specific examples and embodiments, it is to be understood that the invention is not limited thereto and that it can be variously practiced within the scope of the following claims.

The embodiments of this invention in which a particular property or privilege is claimed are defined as follows:

1. A non-caking, free-flowing particulate solid composition comprising a particulate styrene/maleic copolymer or a water soluble derivative thereof, said copolymer being selected from the group consisting of copolymers of styrene and maleic anhydride, maleic acid or esters of maleic acid, having a softening point below 100° C. and having a substantial tendency to cake during storage, said composition having dispersed therein for every 100 parts by weight of said composition, 0.5 part by weight to 20 parts of a styrene/maleic copolymer, said copolymer being selected from the group consisting of copolymers of styrene and maleic anhydride, maleic acid or esters of maleic acid, being soluble in water or in aqueous alkali, having a softening point from 120° C. to about 190° C., and caking very little during storage.

2. Composition of claim 1 wherein the particulate styrene/maleic copolymer having a softening point below 100° C. is a half alkyl ester or a partial glycol ethyl ether ester.

3. Composition of claim 1 wherein the particulate styrene/maleic copolymer having a softening point below 100° C. is an alkyl ester.

4. Composition of claim 1 wherein the particulate styrene/maleic copolymer having a softening point below 100° C. is a half alkyl ester and the anti-caking agent is an alkyl ester of styrene/maleic copolymer.

5. Composition of claim 1 wherein the styrene/maleic copolymer having a softening point below 100° C. is a glycol ethyl ether ester and the anti-caking agent is the methyl butyl ester of styrene/maleic copolymer.

6. Composition of claim 1 wherein the particulate styrene/maleic copolymer having a softening point below 100° C. is the butyl glycol ethyl ether ester and the anti-caking agent is a methyl butyl ester of styrene/maleic copolymer.

7. Composition of claim 1 wherein the particulate styrene/maleic copolymer having a softening point below 100° C. is a half glycol ethyl ether ester and the anti-caking agent is an alkyl ester of styrene/maleic copolymer.

8. Composition of claim 1 wherein the anti-caking agent has a softening point from about 120° C. to about 190° C. and is present in an amount from about 2 parts by weight to about 10 parts by weight per each 100 parts by weight of styrene/maleic copolymer having a softening point below 100° C.

9. A composition of claim 8 wherein said styrene/maleic copolymer having a softening point from about 120° C. to about 190° C. is selected from the group consisting of copolymers of styrene and maleic anhydride, maleic acid, or esters of maleic acid; and ammonium amine or alkali metal salts thereof, said amine salts being selected from the group consisting of amine salts of mono-, di- or tri-methyl amine, ethyl amine, isopropyl amine, ethanol amine and 2-methyl-2-aminoproponal-1, and said styrene/maleic copolymer having a softening point below 100° C. is selected from the group consisting of copolymers of styrene, and maleic anhydride, maleic acid or esters of maleic acid; and ammonium, amine or alkali metal salts thereof, said amine salts being selected from the group consisting of amine salts of mono-, di- or tri-methyl amine, ethyl amine, isopropyl amine, ethanol amine and 2-methyl-2-aminoproponal-1.

References Cited

UNITED STATES PATENTS

| 2,643,245 | 6/1953 | Wilson | 260—78.5 R |
| 2,816,877 | 12/1957 | Price | 260—874 |
| 3,368,987 | 2/1968 | Pollart et al. | 260—17.4 ST |
| 3,468,823 | 9/1969 | Graham et al. | 260—17.4 ST |

LESTER L. LEE, Primary Examiner

U.S. Cl. X.R.

117—155; 260—17.4 ST, 78 ST